United States Patent [19]

Imano et al.

[11] 4,399,031
[45] Aug. 16, 1983

[54] BIOLOGICAL SEWAGE TREATMENT APPARATUS OF THE ROTARY DISC TYPE

[75] Inventors: Shiro Imano, Toyonaka; Yoshio Sasaki, Ibaraki; Yukio Otsuka, Uji; Teruo Nisidome, Osaka, all of Japan

[73] Assignee: Sekisui Kagaku Kogyo Kabushiki Kaisha, Osaka, Japan

[21] Appl. No.: 280,551

[22] Filed: Jul. 2, 1981

[30] Foreign Application Priority Data

Jul. 7, 1980 [JP] Japan ............................. 55-93001
Mar. 25, 1981 [JP] Japan ............................. 56-44540

[51] Int. Cl.³ .............................................. C02F 3/08
[52] U.S. Cl. .................................... 210/150; 261/92
[58] Field of Search ............... 210/150, 151, 619, 232; 261/92

[56] References Cited

U.S. PATENT DOCUMENTS

| 3,827,559 | 8/1974 | Cass et al. ............... | 210/150 |
| 3,886,074 | 5/1975 | Prosser ..................... | 210/150 |
| 3,904,525 | 9/1975 | Rosenberg ............... | 210/150 |
| 4,149,972 | 4/1979 | Iwai et al. ............... | 210/150 |
| 4,268,385 | 5/1981 | Yoshikawa ............... | 210/150 |

FOREIGN PATENT DOCUMENTS

| 53-111656 | 9/1978 | Japan ..................... | 210/150 |
| 54-70639 | 6/1979 | Japan ..................... | 210/151 |
| 1627470 | 3/1972 | United Kingdom ...... | 210/150 |

Primary Examiner—Benoit Castel
Attorney, Agent, or Firm—Wenderoth, Lind & Ponack

[57] ABSTRACT

A sewage treatment apparatus having a rotary shaft and a plurality of rotary plates secured to the rotary shaft in an axially spaced-apart relationship, each of the rotary plates being adapted to be rotated while it is partly dipped in sewage within a treating tank,
a plurality of holding members provided fixedly around the rotary shaft for rotation therewith, and the rotary plates being secured such that at least one rotary plate is fixedly held at its central end portion between every two adjacent holding members.

5 Claims, 10 Drawing Figures

BIOLOGICAL SEWAGE TREATMENT APPARATUS OF THE ROTARY DISC TYPE

BACKGROUND OF THE INVENTION

1. Field of the Invention

This invention relates to a rotary disc-type apparatus for biological treatment of sewage.

2. Description of the Prior Art

A typical sewage treatment apparatus of the rotary disc type comprises a rotary shaft and a plurality of rotary plates secured to the rotary shaft in an axially spaced-apart relationship, said rotary plates being adapted to be rotated while they are partly dipped in sewage within a treating tank. As a result of this rotation, the rotary plates are exposed alternately to the sewage and to oxygen in the atmosphere whereby aerobic bacteria adhering to the rotary plates grow. The bacteria biosorb, coagulate and oxidize organic components in the sewage thereby to purify the sewage. A rather large force is required to rotate the rotary plates having such aerobic microorganisms adhering thereto while dipping them partly in the sewage, and in order to withstand such a force, the rotary plate assembly should have sufficiently high strength.

In one type of known sewage treatment apparatuses including rotary discs, plastic rotary plates are arranged in disc form respectively about plastic mounting plates securable to the periphery of a rotary shaft and bonded by fusion to the mounting plates, and then the mounting plates are fixedly mounted around the rotary shaft. A method is also known which involves bonding the rotary plates to the rotary shaft by packing sponge-like plastics in the space between them (Japanese Patent Publication No. 21819/1977).

In these known apparatuses, however, the strength of the joint between the rotary shaft and the rotary plate assembly which are bonded together through the mounting plates or sponge-like plastics is not sufficiently high so that the joint portion often undergoes damage.

The general trend of the art is to increase the diameter of the rotary plates in an attempt to increase the sewage treating ability of the apparatus without an appreciable increase in installation space. A rotary plate having an increased diameter is often built by assembling a plurality of fan-shaped plates. In the aforesaid conventional apparatuses, a complex operation is required to fix a rotary plate consisting of a plurality of such fan-shaped plates accurately in a predetermined position. Furthermore, bonding of the assembly by fusion requires an additional device designed for this purpose. For these reasons, it is difficult according to the prior techniques to build a sewage treatment apparatus at the site of its use. On the other hand, when a sewage treatment apparatus built in a factory is to be transported to the site of use, there is a restriction on its size.

SUMMARY OF THE INVENTION

It is an object of this invention to remove the aforesaid defects of the rotary disc-type sewage treatment apparatus.

Another object of this invention is to provide a sewage treatment apparatus of the rotary disc type in which rotary plates are firmly fixed to a rotary shaft, and which is hardly likely to undergo damage.

Still another object of this invention is to provide a sewage treatment apparatus which can be easily built at the site of use.

Yet another object of this invention is to provide a sewage treatment apparatus which because of the relatively large diameter of rotary plates, can be relatively easily built even when each rotary plate is made up of a plurality of fan-shaped plates.

The sewage treatment apparatus of this invention is especially suitable when rotating plates and holding members for mounting the rotary plates to a rotary shaft are made of a thin plastic plate such as a plate of polyvinyl chloride, polyethylene, polypropylene, or fiber reinforced plastics (FRP).

According to this invention, there is first provided a sewage treatment apparatus comprising a rotary shaft and a plurality of rotary plates secured to the rotary shaft in an axially spaced-apart relationship, each of said rotary plates being adapted to be rotated while it is partly dipped in sewage within a treating tank, characterized in that a plurality of holding members are fixedly mounted around the rotary shaft for rotation therewith, and said rotary plates are secured such that one or more, preferably one or two, of the rotary plates are fixedly held at their central end portion between every two adjacent holding members.

According to one embodiment of the apparatus of this invention, two adjacent holding members are formed such that projecting portions formed on one of them can be fitted in depressed portions formed in the other. A rotary plate having bulged portions conforming to the projecting and depressed portions is fixedly held at its bulged portion between these adjoining holding members.

According to another embodiment of the apparatus of this invention, adjacent holding members are formed such that depressed portions are formed in one of the holding members and those portions of the other holding member which are to face the above depressed portions are formed in a flat or inversely depressed shape. In this embodiment, a rotary plate having bulged portions fittable in the depressed portions and a rotary plate having a flat portion at its part to be held are held in super-position between the two adjacent holding members.

In still another embodiment of the apparatus of this invention, adjacent holding members are bonded by fusing or otherwise to a rotary plate held betweem them at their holding portions.

DETAILED DESCRIPTION OF THE PREFERRED EMBODIMENTS

Figure 1:
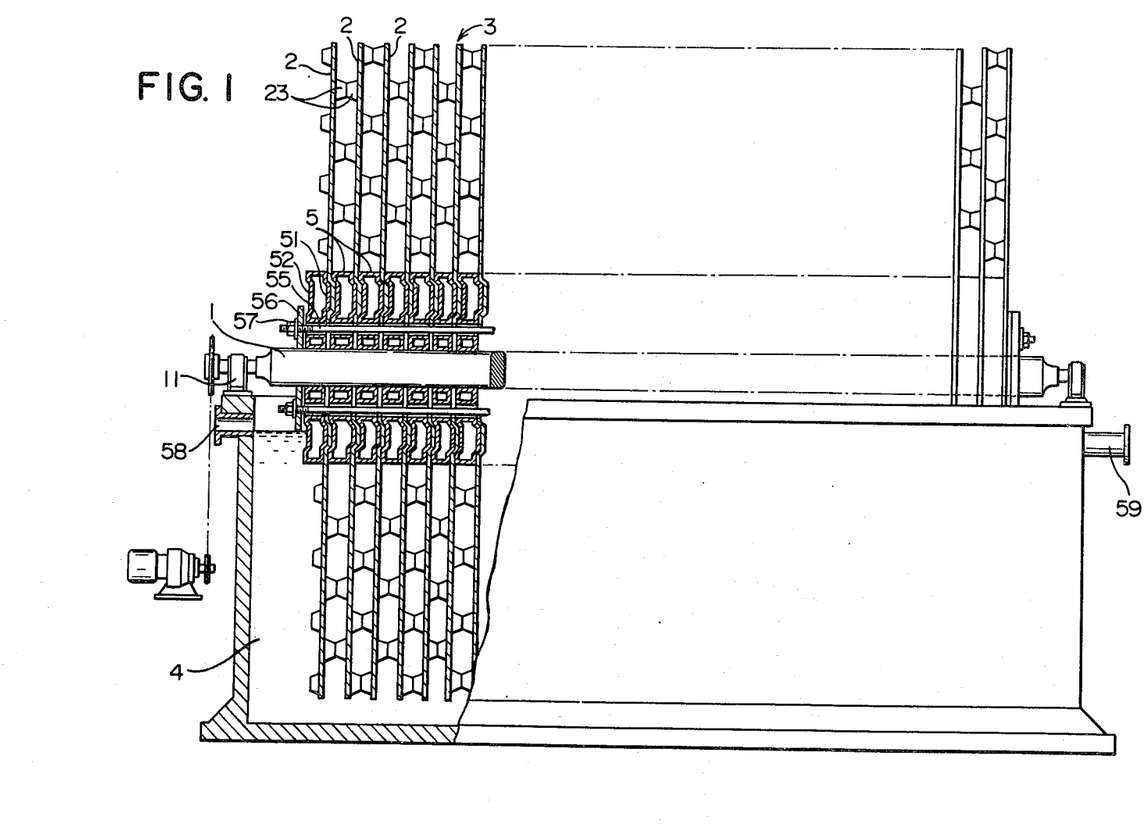
FIG. 1 is a front elevation, partly in section, of one embodiment of the sewage treatment apparatus of the invention.

Referring to FIG. 1, a rotary plate assembly 3 is constructed of a plurality of rotary plates 2 secured to a rotary shaft 1 in an axially spaced-apart relationship. The rotary shaft 1 is supported by bearings 11, and each rotary plate 2 is adapted to be rotated while it is partly dipped in sewage contained in a treating tank 4. The rotary plates 2 are held between the holding members 5, and two adjacent holding members 5 and the rotary plate 2 held therebetween are welded at the holding position into a unitary structure.

Between two adjacent holding members 5, the rotary plate 2 is fixed at its central portion between projecting portions 51 formed on one of the holding members 5 and depressed portions 52 formed in the other.

Figure 2:
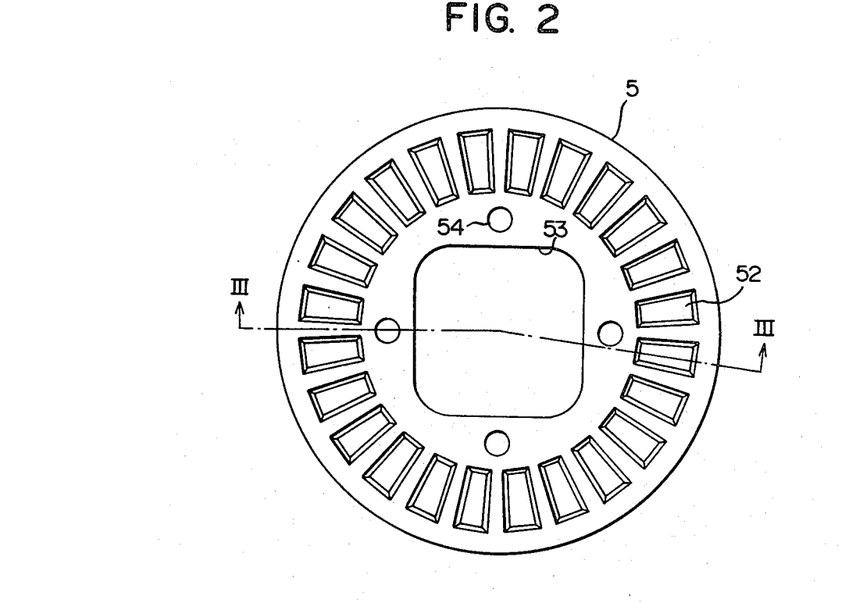
FIG. 2 is a front elevation showing one embodiment of a holding member used in the apparatus of the invention.
Figure 3:
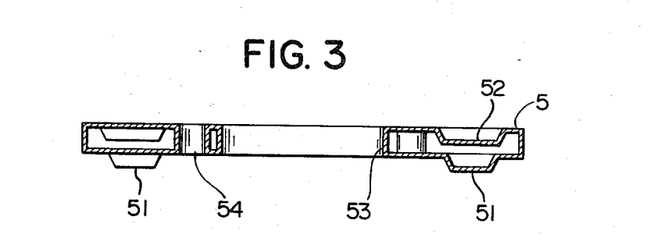
FIG. 3 is a sectional view taken along line III—III of FIG. 2.

Each holding member 5 is molded in a hollow shape from a thin piece of a synthetic resin such as polyvinyl chloride, polypropylene, polyethylene, or FRP, and is disc-like as shown in more detail in FIGS. 2 and 3. It has a nearly square central hole 53 substantially conforming to the outside contour of the rotary shaft for receiving the rotary shaft 1 therethrough and so as to be rotatable with it. Projecting portions 51 are formed on one surface of the disc-like holding member 5, and depressed portions 52, on the other surface. The projecting portions 51 and the depressed portions 52 are provided at the same circumferential distance from the center of the disc-like holding member 5, so that the projecting portions of one holding member 5 will fit into the depressed portions of an adjacent holding member 5 with the rotary plate 2 held fixedly therebetween.

Holes 54 are provided in the holding member 5 for inserting therethrough connecting rods 55 for clamping the holding members and the rotary plates to each other. The holding member 5 may be made of a synthetic resin foam having a surface skin layer which is prepared from rigid polystyrene, rigid polyurethane or rigid polyacrylonitrile. Desirably, the holding members 5 are light in weight.

Figure 4:
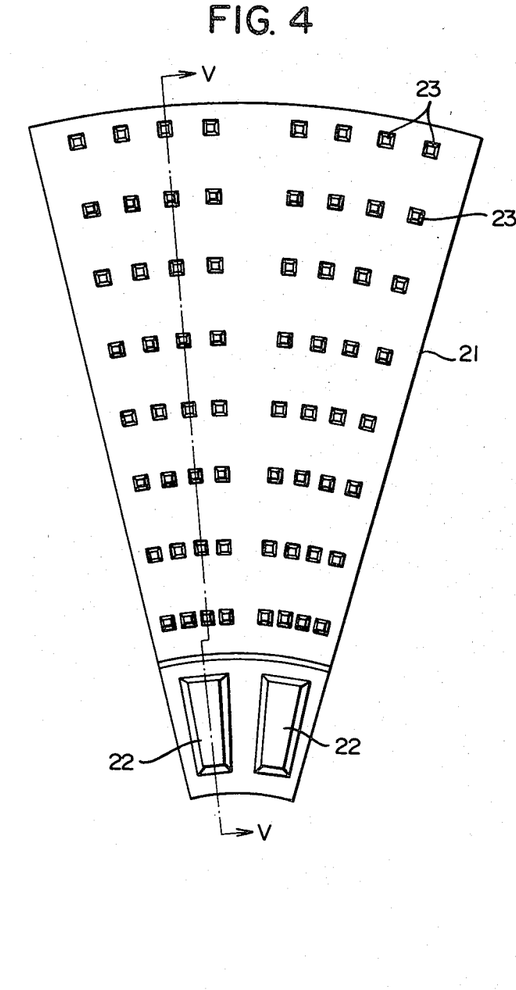
FIG. 4 is a front elevation of one embodiment of a fan-shaped plate constituting part of a rotary plate.
Figure 5:
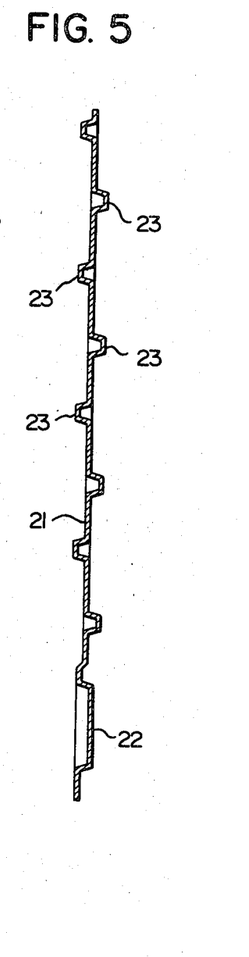
FIG. 5 is a sectional view taken along line V—V of FIG. 4.

As shown in FIGS. 4 and 5, the rotary plate 2 may be made of a plurality of fan-shaped plates 21. Each fan-shaped plate 21 has at its central end portion bulged portions 22 which are so positioned and shaped as to fit the depressed portions and the projecting portions of the holding member 5. Protrusions 23 are formed on both surfaces of each fan-shaped plate 21, so that when rotary plates 2 each composed of the fan-shaped plates 21 are aligned at intervals, the protrusions 23 of adjacent fan-shaped plates 21 contact each other to maintain a clearance between the plates 21. As shown in FIG. 5, the protrusions 23 are aligned radially in the fan-shaped plate 21. A plurality of circumferentially extending grooves may be formed alternately on one surface and the other of the fan-shaped plate 21, or a plurality of grooves may also be formed in the radial direction. This results in an increase in surface area and also enhances the rigidity of the fan-shaped plate 21. Holding of the rotary plate 2 between holding members 5 is effected, for example, by the following procedure. A plurality of fan-shaped plates 21 are arranged annularly around a first holding member 5, and bulged portions 22 of the fan-shaped plates 21 are caused to fit the projecting portions 51 or the depressed portions 52 of the holding members 5. Then, a second holding member 5 is laid adjacent the fan-shaped plates 21 so that its depressed portions or projecting portions fit the bulged portions of the fan-shaped plates. Thus, a first rotary plate 2 is held between the holding members. Next, a plurality of fan-shaped plates 21 are laid so that their protrusions 23 contact the protrusions 23 of the first rotary plate and the bulged portions 22 of the fan-shaped plates 21 are caused to fit the projecting portions or depressed portions of the second holding member thereby to hold a second rotary plate 2. Further, a third holding member 5 is aligned adjacent the second rotary plate. This procedure is repeated until the required number of rotary plates 2 are aligned. Then, bolts 55 are inserted through the holes 54 of the holding members 5, and side plates 56 are placed in contact with the opposite ends of the rotary plate assembly and clamped by means of nuts 57, thereby to build an assembly 3.

In the assembly 3, the holding members and the rotary plates may be welded to each other at their holding portions. Such welding is preferred because it will increase the rigidity of the assembly 3. Furthermore, in the assembly 3, the rotary plates may be welded to each other at their protrusions 23 which are in abutment. This welding further increases the strength of the assembly 3. Welding may be performed by using welding rods to be described.

A shaft 1 having a square outside configuration substantially conforming to the contour of the hole 53 of the holding members 5 is inserted in the hole 53 of the assembly 3, and at a predetermined position, liners are placed in the space between the shaft 1 and the hole 53 of the holding members to fix the assembly 3 in position. Alternatively, the above space can be filled with a foamable resin which is expanded therein to fix the assembly 3 in position. At both end portions of the assembly 3, fixing members are clamped on the rotary shaft 1 thereby to fix the assembly 3 in position.

By supporting the rotary shaft 1 on bearings 11 provided on the side wall of a sewage tank 4, the sewage treatment apparatus of this invention is built. In FIG. 1, the reference numeral 58 represents a sewage influent port, and 59, a sewage effluent port.

When two or more bulged portions 22 are provided in each fan-shaped plate 21 and each bulged portion is fitted in a space between the projecting portion 51 of one holding member and the depressed portion 52 of an adjoining holding member to hold the plate 21 between the holding members 5, fixing of the fan-shaped plate 21 to the holding members becomes firmer, and the position at which the fan-shaped plate is fixed to the holding member 5 is set. Hence, assembling can be effected easily and accurately.

The strength of the assembly 3 is further increased if the fan-shaped plates 21 in adjoining rotary plates 2 are arranged in such a manner that in the circumferential direction, one fan-shaped plate 21 in one rotary plate 2 is circumferentially offset from an opposing fan-shaped plate in the other rotary plate, so that the one fan-shaped plate 21 overlaps one-half of the area of an opposing fan-shaped plate 21 in the other rotary plate 2, and also if the rotary plates 2 are bonded to each other at the protruding portions 23.

When the diameter of the rotary plate is large, each fan-shaped plate 21 may have a central angle of about 30° or about 45°. When it is small, the central angle of the fan may be increased to about 120° or about 180°.

Preferably, the fan-shaped plates are formed by vacuum forming or blow forming of a thin plate of a synthetic resin such as polyvinyl chloride or polyethylene because the molding and processing are simple and they are light in weight and inexpensive.

In the embodiment described hereinabove, a rotary plate having bulged portions is held between a pair of holding members 5 having projecting portions and depressed portions respectively, and the holding members are welded to the rotary plate at their holding position. Welding, however, may be omitted if desired. Alternatively, instead of providing the aforesaid projecting portions or depressed portions in the holding members, a flat rotary plate may be held between a pair of holding members having flat opposing surfaces, and welded to the holding members at the holding position.

Figure 6:
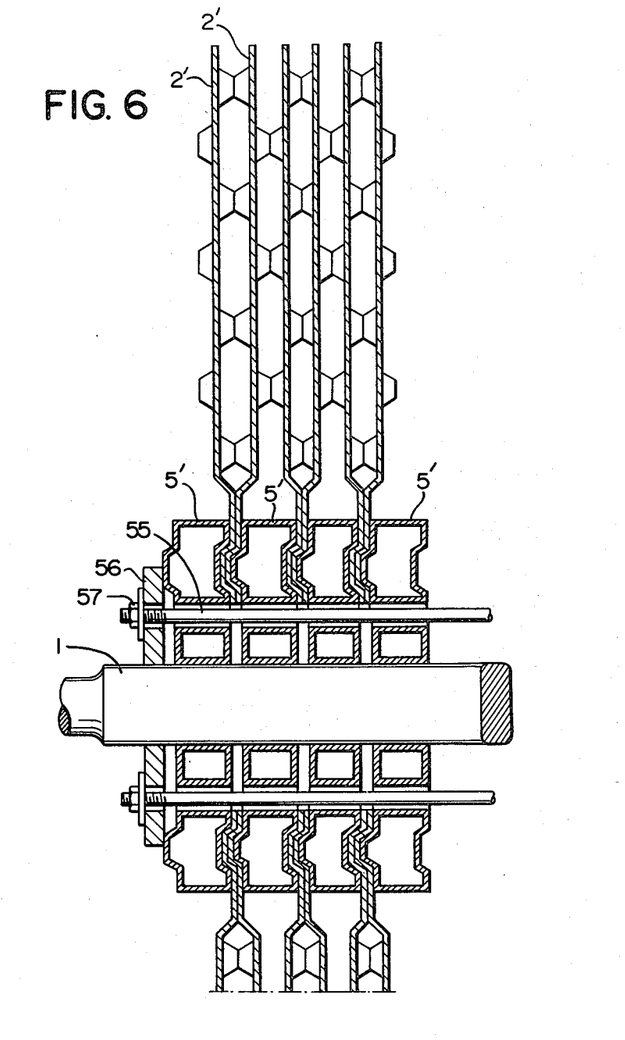
FIG. 6 is a sectional view, of a part, of a rotating plate assembly used in the apparatus of this invention.

FIG. 6 shows another example of a rotary plate assembly in which two rotary plates 2' are held between each pair of holding members 5'. Two rotary plates 2' adjoining each other and with a gap between the radially outer portions thereof are bent at their central end portion so as to be in intimate contact with each other, and are thus held by a pair of holding members 5'. Each rotary plate 2' is formed of a combination of fan-shaped plates, and in two adjacent rotary plates 2', the fan-shaped plates are aligned in such a manner that in the circumferential direction, one fan-shaped plate in one rotary plate 2' overlaps one-half of the area of the opposing fan-shaped plate in the other rotary plate 2'. As a result of holding two rotary plates by only one pair of holding members, the thickness of the holding member 5' can be increased, and also if the rotary plates are to be aligned at the same intervals as in the above-described embodiment, the number of holding members used can be reduced.

The invention is further described below with reference to FIGS. 7 to 10 showing other embodiments in which different holding members and different methods of holding are employed.

Figure 7:
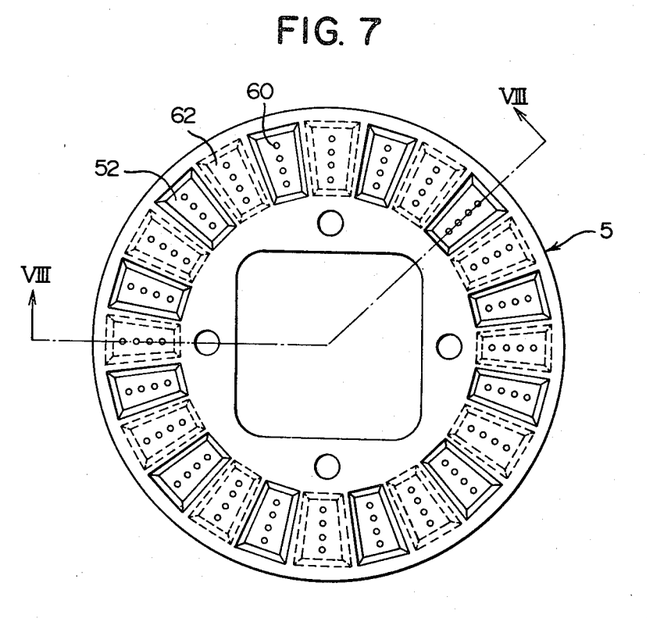
FIG. 7 is a front elevation of another embodiment of the holding member.
Figure 8:
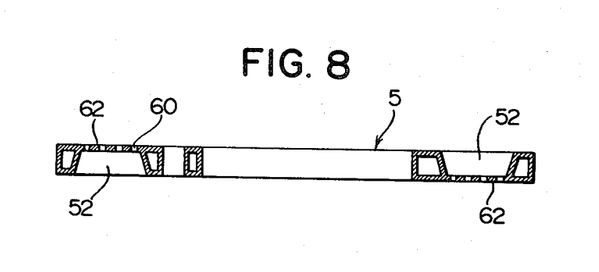
FIG. 8 is a sectional view taken along line VIII—VIII of FIG. 7.

In each of the holding members 5 shown in FIGS. 7 and 8, depressed portions 52 are provided alternately with flat portions 62 in the circumferential direction on both surfaces, and the depressed portions on one surface are located at the same position as the flat portions on the other, and the flat portions on one surface are located at the same positions as the depressed portions on the other. In each of the surfaces, there are provided twelve depressed portions 52 spaced at equal intervals.

Figure 9:
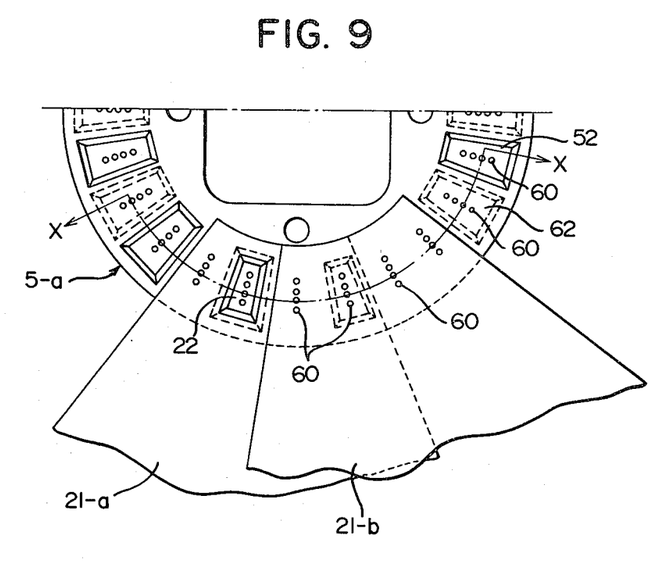
FIG. 9 is a front elevation of another embodiment showing fan-shaped plates fixed constituting a rotary plate to holding members (only two fan-shaped plates are shown)
Figure 10:
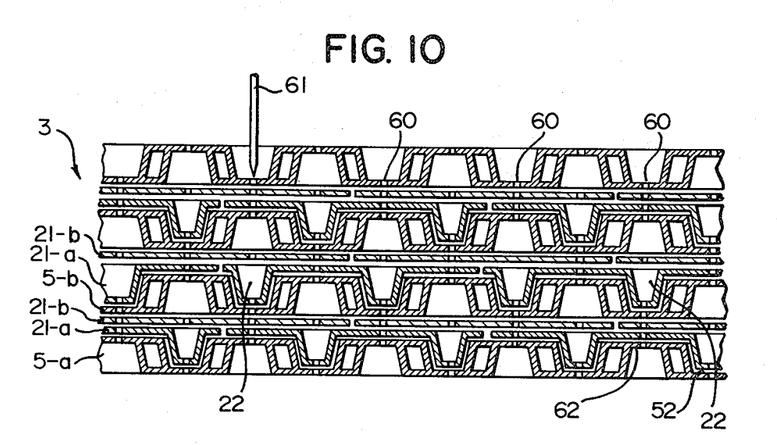
FIG. 10 is a sectional view taken along line X—X of FIG. 9 and viewed from the central position of the holding member (fan-shaped plates are secured to the entire circumference of the holding member).

Referring to FIGS. 9 and 10, six fan-shaped plates 21-a having projecting portions 22 capable of fitting depressed portions 52 in a first holding member 5-a and having a central angle of 60° are aligned on the first holding member 5-a to form a first rotary plate (in FIG. 9, only one of the fan-shaped plates is shown). Then, flat fan-shaped plates 21-b having a central angle of 60° and having no projecting portion are placed over the first rotary plate and circumferentially offset at an angle 30° with respect to the fan-shaped plates 21-a in the first rotary plate, thereby forming a second rotary plate (only one of the fan-shaped plates 21-b is shown in FIG. 9). Then, on the second rotary plate there is placed a second holding member 5-b corresponding to the inverted first holding member 5-a in a position such that the depressed portions of the second holding member face the depressed portions of the first holding member (see FIG. 10). Then, the same fan-shaped plates 21-a as those constituting the first rotary plate are laid over the second holding member 5-b in the same manner as described above. This operation is repeated to form a rotary plate assembly (such as the one shown in FIG. 6) in which two rotary plates are held between a pair of holding members as shown in FIG. 10.

As FIGS. 9 and 10 show, the holding members and rotary plates have small holes 60 formed therein are brought into mating positions when the holding members and rotary plates are assembled. Melting rods 61 having a diameter slightly larger than the hole 60 and heated to a temperature above the melting point of the assembly are inserted through the holes 60 of the assembly 3. This results in melting of the neighborhood of the holes 60, and the holding members are melt-bonded to the rotary plates at the sites of the holes 60.

In the sewage treatment apparatus of this invention, rotary plates are fixedly held by holding members which are fitted onto a rotary shaft for rotation with it. Thus, despite the relatively simple assembling operation, the rotary plates can be firmly fixed. Still firmer mixing of the rotary plates can be achieved by providing in one of a pair of holding members projecting portions and depressed portions in the other so that the rotary plate can be held fixedly between the projecting portions and the depressed portions. Hence, the holding portion does not undergo damage even when the force of the rotary plates on the holding members increases as a result of the adhesion of aerobic bacteria to the rotary plates or as a result of increasing the diameter of the rotary plates.

When the rotary plate is composed of a combination of fan-shaped plates, the fan-shaped plates can be easily fixed in position by holding them between the projecting portions and the depressed portions of the holding members. Furthermore, since the holding members can be mechanically assembled by clamping with a connecting rod, etc., they can be assembled at the site of use. Thus, the apparatus of this invention is free from the restriction on the size of rotating plates which is imposed when transporting factory-assembled apparatuses.

Instead of, or in addition to, the aforesaid fitting of the projecting portions and the depressed portions, the assembly of the rotary plates and the holding members can be welded at their held positions to achieve firm fixing. When the rotary plates and the holding members are made of synthetic resin, the welding can be easily effected by inserting welding rods into holes provided in the holding members. Accordingly, such a welding operation can be easily performed at the site of use of the apparatus.

What we claim is:
1. A sewage treatment apparatus comprising:
a rotary shaft;
a plurality of holding members fixedly mounted on said rotary shaft for rotation therewith, each of said holding members having a plurality of circumferentially spaced depressed portions at equal distances from the axis of rotation of said shaft; a plurality of rotary plates spaced axially along said shaft and being adapted to be rotated for being partly dipped in sewage in a treating tank;

at least some of said rotary plates having at least one projecting portion on the radially inner end thereof complementary in shape to said depressed portions in said holding members, each of said rotary plates with the projection thereon having said inner end fixedly held between two adjacent holding members with the projecting portion engaged in a corresponding depressed portion of one of the two holding members and any remaining rotary plates having no projections thereon being held between a rotary plate and the other of the two holding members;

said holding members further having projecting portions thereon on the opposite sides thereof from said depressed portions and having flat portions between the depressed portions, the flat portions on one side being in positions corresponding to depressed portions on the other side, and said rotary plates having depressed portions on the opposite sides thereof from said projecting portions, the lastmentioned projecting portions on said holding members being engaged with said lastmentioned depressed portions on said rotary plates, said rotary plates having no projections thereon being between the sides of said rotary plates on the opposite side from which said projecting portions project and said flat portions on the next adjacent holding members; and said holding members and rotary plates having small holes therein which are aligned when the holding members and rotary plates are assembled, and the material of said holding members and said rotary plates being melt-bonded to each other around the peripheries of said holes.

2. An apparatus as claimed in claim 1 in which all of the projecting portions on said rotary plates and said holding members extend in the same axial direction relative to said shaft.

3. An apparatus as claimed in claim 1 in which some of the projecting portions on said rotary plates and said holding members which are engaged with each other projecting in one axial direction relative to said shaft and the remainder project in opposite axial direction.

4. An apparatus as claimed in claim 1 wherein the adjacent holding members are welded to the rotary plate held therebetween.

5. An apparatus as claimed in claim 1 wherein the rotary plates and the holding members are made of a synthetic resin selected from the group consisting of polyvinyl chloride, polyethylene, polypropylene and fiber-reinforced plastics.

* * * * *